United States Patent
Kalla et al.

(10) Patent No.: US 11,113,072 B2
(45) Date of Patent: Sep. 7, 2021

(54) BOOT PERSONALITY FOR NETWORK DEVICE

(71) Applicant: Arista Networks, Inc., Santa Clara, CA (US)

(72) Inventors: Fakherdin Kalla, Buraby (CA); Gil Adrian Torres, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 129 days.

(21) Appl. No.: 16/530,882

(22) Filed: Aug. 2, 2019

(65) Prior Publication Data

US 2021/0034376 A1   Feb. 4, 2021

(51) Int. Cl.
*G06F 9/4401* (2018.01)
*G06F 8/61* (2018.01)

(52) U.S. Cl.
CPC .............. *G06F 9/4416* (2013.01); *G06F 8/61* (2013.01); *G06F 9/4405* (2013.01); *G06F 9/4411* (2013.01)

(58) Field of Classification Search
CPC ........ G06F 9/4416; G06F 9/4411; G06F 8/61; G06F 9/4405
USPC ............................................. 713/2; 717/174
See application file for complete search history.

(56) References Cited

U.S. PATENT DOCUMENTS

| 6,684,324 | B2* | 1/2004 | Floman | G06F 9/445 713/1 |
| 7,233,977 | B2* | 6/2007 | Gupta | G06F 15/16 709/216 |
| 7,401,165 | B2* | 7/2008 | Nishimoto | G06F 13/4068 710/14 |
| 8,539,471 | B2* | 9/2013 | Morton | G06F 8/654 717/168 |
| 2009/0094450 | A1* | 4/2009 | Krzyzanowski | G06F 11/1433 713/100 |
| 2011/0035575 | A1* | 2/2011 | Kwon | G06F 9/4405 713/2 |
| 2015/0253832 | A1* | 9/2015 | Nishimoto | G06F 13/4045 713/323 |
| 2017/0286128 | A1* | 10/2017 | Yang | G06F 8/654 |

* cited by examiner

*Primary Examiner* — Chun Cao
(74) *Attorney, Agent, or Firm* — Chamberlain, Hrdlicka, White, Williams & Aughtry (57) ABSTRACT

Embodiments described herein may relate to methods, systems, and/or instructions stored on non-transitory computer readable mediums for managing a boot personality of a network device. Managing a boot personality may include, while executing a first operating system on a network device in a first boot personality using a first processor, executing a command to modify a configuration of a hardware component of the network device to cause the network device to be configured in a second boot personality. The method may also include rebooting the network device; initializing, based on the configuration of the hardware component, a second processor before the first processor; and executing, after the initialization, a second operating system while the network device is in the second boot personality.

18 Claims, 4 Drawing Sheets

BOOT PERSONALITY FOR NETWORK DEVICE

BACKGROUND

Network devices often include an operating system executing thereon, Operating systems may require different sets of hardware to execute, and/or that various hardware components (e.g., processors) are powered on in different orders while the network device boots.

SUMMARY

In general, in one aspect, embodiments described herein may relate to a method for managing a boot personality. The method may include, while executing a first operating system on a network device in a first boot personality using a first processor, executing a command to modify a configuration of a hardware component of the network device to cause the network device to be configured in a second boot personality. The method may also include rebooting the network device; initializing, based on the configuration of the hardware component, a second processor before the first processor; and executing, after the initialization, a second operating system while the network device is in the second boot personality.

In general, in one aspect, embodiments described herein may relate to a non-transitory computer readable medium including instructions that, when executed by a processor, perform a method for managing a boot personality. The method may include, while executing a first operating system on a network device in a first boot personality using a first processor, executing a command to modify a configuration of a hardware component of the network device to cause the network device to be configured in a second boot personality. The method may also include rebooting the network device; initializing, based on the configuration of the hardware component, a second processor before the first processor; and executing, after the initialization, a second operating system while the network device is in the second boot personality.

DETAILED DESCRIPTION

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems and instructions on non-transitory computer readable mediums for managing the boot personality of a network device. In one or more embodiments, certain operating systems require that the main one or more processors of a network device be powered on during boot of the network device prior to powering certain secondary processors, such as, for example, a baseboard management controller (BMC). Powering the primary processor(s) of the network device prior to powering a secondary processor may allow the primary processor(s), and, by extension, an operating system executing thereon, to control monitoring of various aspects of the network device, such as, for example, temperature, humidity, power supply voltage, fan speeds, various communication parameters, boot loader configuration, console access (e.g., via a serial port), etc. The scenario of powering the primary processor(s) of a network device before any secondary processor may be referred to as a first boot personality for the network device. When operating using such a first boot personality, one or more secondary processors may not be used, and, thus, may be kept in a certain state (e.g., a 'reset' state) because they are not utilized during operation of the network device in the first boot personality.

In one or more embodiments, an operating system for a network device may require that a secondary processor of the network device be powered during boot of the network device prior to powering the primary processor(s) of the network device. For example, some operating systems may require a BMC to be powered during boot before powering a primary processor of the network device, so that the BMC, rather than a primary processor, controls monitoring of various aspects of the network device, such as, for example, temperature, humidity, power supply voltage, fan speeds, various communication parameters, boot loader configuration, console access (e.g., via a serial port), etc. The scenario of powering a secondary processor of a network device before any primary processor(s) may be referred to as a second boot personality for the network device. In such a second boot personality, the network device operating system may execute on a primary processor that is in communication (e.g., via an Internet Protocol (IP) address over a Universal Serial Bus (USB) connection) with the secondary processor regarding the various aspects of the network device being monitored and/or managed by the secondary processor (e.g., a BMC).

In one or more embodiments, in order to change the operating system executing on a network device, certain steps must be taken to allow the network device to change from one boot personality to another boot personality during a reboot. Such steps may include, but are not limited to, executing instructions (e.g., running a script) within a first operating system that causes a configuration change to one or more hardware components that directly or indirectly control the order that network device components (e.g., processors) are powered on during a boot or reboot of the network device.

Figure 1:
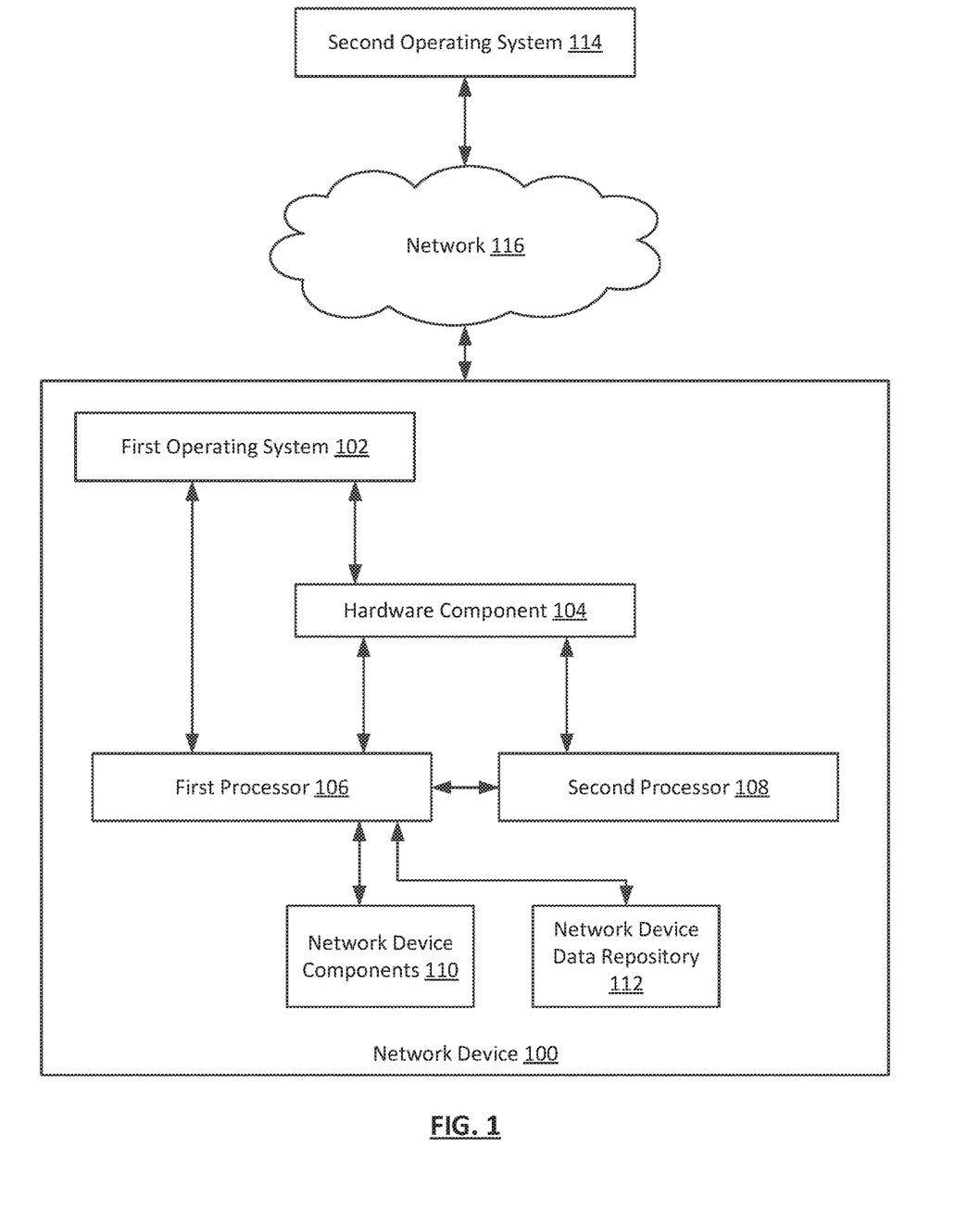
FIG. 1 shows a system in accordance with one or more embodiments described herein.

FIG. 1 shows a system in accordance with one or more embodiments described herein. As shown in FIG. 1, the system includes a network device (100). The network device (100) may include a first operating system (102), a hardware component (104), a first processor (106), a second processor (108), any number of network device components (e.g., network device components (110)), and a network device data repository (112). The system may also include a second operating system (114) and a network (116). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fibre channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device (100).

In one or more embodiments, a network device (100) also includes and/or is operatively connected to device storage and/or device memory (i.e., non-transitory computer readable mediums) storing software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform methods of embodiments as described herein, and may be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, the network device (100) is part of a network (116). A network (116) may refer to an entire network or any portion thereof (e.g., a logical portion of the devices within a topology of devices). A network (116) may include a datacenter network, a wide area network, a local area network, a wireless network, a cellular phone network, or any other suitable network that facilitates the exchange of information from one part of the network to another. In one or more embodiments, the network (116) may be coupled with or overlap, at least in part, with the Internet. In one or more embodiments, a network (116) includes a collection of one or more network devices (e.g., network device (100)) that facilitate network connectivity for one or more operatively connected devices (e.g., computing devices, data storage devices, other network devices, etc.) (not shown). In one or more embodiments, the network device (100) and other devices within the network (116) are arranged in a network topology (not shown). In one or more embodiments, a network topology is an arrangement of various devices of a network (116).

In one or more embodiments, a network device (100) includes a first operating system (102), which may execute on a first processor (106) of a network device (100) while the network device (100) is in a first boot personality. In one or more embodiments disclosed herein, an operating system (OS) includes any software and/or firmware for managing the resources (e.g., hardware, other software, etc.) of one or more computing devices (e.g., network device (100)). More specifically, the OS may be a program or set of programs that manages all or any portion of the other software (e.g., applications, agents, etc.) in a computing device (e.g., a network device), as well as all or any portion of the hardware of a computing device (e.g., a network device). Management by an OS may include scheduling, hardware allocation, application execution, network access, management of access to stored files that are selectively made available to applications running on the OS, etc. An OS may also manage and enforce settings and permissions customized for specific applications running within the OS. In one or more embodiments, a first operating system (102) may be an operating system that executes on a network device (100) when the network device (100) is in a first boot personality, and, as such, may require that a primary processor (e.g., first processor (106)) be powered on during boot or reboot of a network device prior to any secondary processors (e.g., second processor (108)) are powered on.

In one or more embodiments, the first operating system (102) is stored in a network device data repository (e.g., persistent storage, such as, for example, a solid state drive) (112) included in and/or operatively connected to a network device (100). In one or more embodiments, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located within the same device (e.g., a network device).

In one or more embodiments, a second operating system (114) is substantially similar to a first operating system, except that it has certain differing requirements in the order that processors (e.g., first processor (106), second processor (108)) of a network device are powered on. For example, a second operating system (114) may require that a BMC (e.g., second processor (108)) be powered before a primary processor (e.g., first processor (106)) of a network device so that the BMC monitors and/or controls certain aspects of network device operation.

In one or more embodiments, a second operating system (114) is stored in a location accessible to a boot loader (discussed below) of a network device (100). For example, as shown in FIG. 1, a second operating system may be stored in a data repository (not shown) that is accessible via a network (116), and may be obtained and stored in persistent storage of the network device when the network device is set to a second boot personality. Although not shown in FIG. 1, a second operating system (114) may additionally or alternatively be stored in any other location accessible to a boot loader of a network device (100), such as, for example, a local solid state drive, a detachable USB flash drive, etc.

In one or more embodiments, a first processor (106) of a network device (100) comprises integrated circuitry capable of executing instructions. Such instructions may, in various embodiments, be written in any programming language now known or later developed. In one or more embodiments, the first processor may be considered the primary processor of the network device (100). In one or more embodiments, a processor (e.g., first processor (106)) may include any number of processing cores, and may include or be operatively connected to memory (not shown) of any type, any number of persistent storage devices, e.g., a hard disk, an optical drive such as a compact disk (CD) drive or digital versatile disk (DVD) drive, a flash memory, etc.), any number of input/output devices, any number of network chips (e.g., application specific integrated circuits (ASICs), field programmable gate arrays (FPGAs) etc.), any number of sensors, any number of computer busses and devices attached thereto, and/or any other hardware component that may be used during operation of a network device (100). In one or more embodiments, the first processor is the processor on which an operating system of a network device executes while the network device is in operation, whether the network device is in a first boot personality or a second boot personality.

In one or more embodiments, a second processor (108) is substantially similar to the first processor, in that it also includes integrated circuitry for executing instructions. In one or more embodiments, a second processor (108) is a specialized processor capable of monitoring at least a portion of the physical state of a network device (100) and/or performing at least a portion of the capabilities of a first processor (106). In one or more embodiments, when a network device (100) is in a first boot personality, a second processor (108) may be powered on after the first processor (106), and may be substantially unused during operation of the network device (100). For example, the second processor (108) may, when a network device (100) is in a first boot personality, be kept in a 'reset' state unless a boot personality change occurs to a second boot personality. In one or more embodiments, when a network device (100) is in a second boot personality, a second processor (108) may be powered on before a first processor (106).

In one or more embodiments, a second processor (108) may have certain hardware lines (e.g., from various sensors, input/output devices, etc.), at least some of which may be referred to as 'slow signals', operatively connected to it when a network device (100) is in a second boot personality that are instead operatively connected to the first processor (106) when the network device is in a first boot personality. In one or more embodiments, a second processor (108) may have a firmware, which may be changed from time to time (e.g., when a boot personality change occurs). One example of a second processor is a BMC.

In one or more embodiments, a first processor (106) and a second processor (108) may be operatively connected to each other. Such an operative connection may go substantially unused when a network device (100) is in a first boot personality unless a boot personality switch occurs. Such an operative connection may be used when a network device (100) is in a second boot personality so that the second processor (108) may provide the operating system executing on a first processor (106) with information regarding hardware components being monitored and/or controlled by a second processor, any inputs received over any communication channel, etc. One example of an operative communication link between a first processor (106) and a second processor (108) is a Universal Serial Bus (USB) link. In one or more embodiments, the processors communicate using any suitable communication protocol over the operative connection. One example of such a communication protocol is IP version 6 (IPv6).

Although not shown in FIG. 1, a network device (100) may include a boot loader. In one or more embodiments, a boot loader may be software that is stored in read-only memory of a network device (100), and that is invoked when a network device is powered on (i.e., booted or rebooted). In one or more embodiments, a boot loader includes, but is not limited to, functionality for obtaining an operating system (e.g., from persistent storage of a network device, over a network, etc.), initiating certain processes for a network device, configuring certain network parameters of a network device, etc. A boot loader may or may not include an operating system that provides a command line interface (e.g., a 'shell') and/or any other user interface that allows a user to access at least some functionality of a network device (e.g., when a usable operating system cannot be obtained and loaded). In one or more embodiments, when a boot loader obtains an operating system (e.g., second operating system (114)) from a location other than storage included in a network device (e.g., over a network, from a USB flash drive, etc.), the boot loader may include functionality to store the operating system to persistent storage of the network device (100). In one or more embodiments, a boot loader is controlled, at least in part, by a secondary processor (e.g., second processor (108)) when a network device is in a second boot personality. In one or more embodiments, when a network device (100) changes from one boot personality to another, the boot loader may be replaced or modified, and the replaced or modified bootloader may be selected as the new boot loader upon reboot of the network device.

In one or more embodiments, a network device (100) includes any number of hardware components (e.g., hardware component (104)). As used herein, a hardware component (104) is any hardware of a network device (100) that performs any actions relating to the order in which any other hardware of a network device is powered on. For example, a hardware component (104) may be one or more components that are activated when a network device is powered on, and then control the order in which processors of the network device are powered on (e.g., first processor (106) before second processor (108), second processor (108) before first processor (106), etc.), in addition to controlling the order of powering on other components of a network device. In one or more embodiments, a hardware component is operatively connected to two or more processors (e.g., 106, 108) of a network device (100).

In one or more embodiments, the order in which one or more hardware components (e.g., hardware component (104)) power on processors of a network device is determined by the state of one or more bits in persistent storage included in or operatively connected to the one or more hardware components. For example, a power management component and an FPGA may be considered a hardware component (104), and one or more bits in non-volatile storage of the power management component may control the current and/or next boot personality of the network device (100). In such an example, when the bit of the power management component is set to zero, the FPGA may alter its initialization path, and the network device boots or reboots in a first boot personality and executes a first operating system. Conversely, in such an example, when the bit of the power management component is set to one, the network device (100) boots in a second boot personality and executes a second operating system. Such bits may be toggled using any suitable scheme for changing a bit. For example, when executing a first operating system in a first boot personality, a script may be executed to change the state of one or more bits to a second boot personality such that, upon a reboot, a network device obtains a second operating system and boots in a second boot personality.

In one or more embodiments, a network device (100) includes any number of network device components (110). In one or more embodiments, a network device component (110) is any component that may be monitored and/or controlled by a processor (e.g., 106, 108) of a network device (100), and that have operative connections to a processor that may be moved to a different processor when a boot personality of a network device is changed. As shown in FIG. 1, the network device components (110) are operatively connected to the first processor (106), which is the case when the network device (100) is in a first boot personality. However, if the network device (100) were configured to be in a second boot personality, upon reboot, at least a portion of the network device components (110) would instead be operatively connected to the second processor (108) shown in FIG. 1 (see, e.g., FIG. 3B). Examples of network device components (110) include, but are not limited to, temperature sensors, serial ports, fan speed sensors, humidity sensors, voltage sensors, etc.

While FIG. 1 shows a configuration of components, other configurations may be used without departing from the scope of embodiments described herein. For example, there may be any number of processors. As another example, there may be any number of hardware components. As another example, there may be any number of network device components. As another example, there may be any number of data repositories. As another example, there may be any number of components, software instances, etc. that are not shown in FIG. 1. As another example, a second operating system may be stored in persistent storage included in or directly attached to a network device instead of being attached via a network. Accordingly, embodiments disclosed herein should not be limited to the configuration of components shown in FIG. 1.

Figure 2:
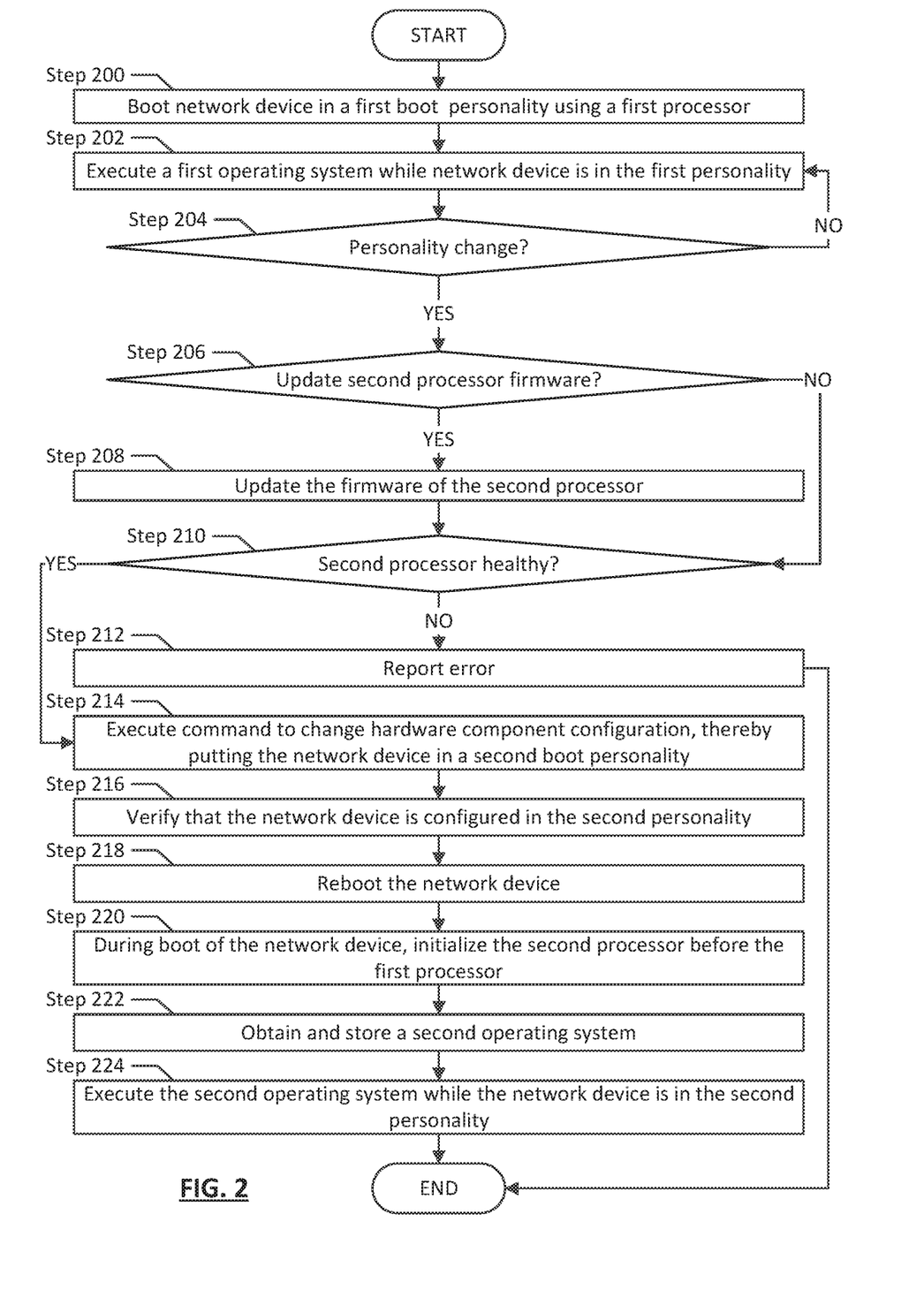
FIG. 2 shows a flowchart in accordance with one or more embodiments described herein.

FIG. 2 shows a flowchart describing a method for changing the boot personality of a network device in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a network device is booted. In one or more embodiments, the network device is configured in a first boot personality. Such configuration may be performed, for example, by setting one or more bits in persistent storage of one or more hardware components to a certain state that is associated with the first boot personality. In one or more embodiments, when in a first boot personality, a primary processor may be powered on by a hardware component (e.g., a power manager) before a secondary processor is powered on. In one or more embodiments, after power is provided to a secondary processor, the secondary processor may be put in a certain state, as it will remain substantially unused while the network device is in a first boot personality.

In Step 202, in one or more embodiments, while in a first boot personality, a network device may execute a first operating system on a primary processor of the network device. In one or more embodiments, the first operating system may have a requirement that the primary processor be powered on during boot or reboot before a secondary processor is powered on. In one or more embodiments, the first operating system may also require having certain network device components operatively connected to the primary processor instead of to a secondary processor.

In Step 204, a determination is made whether a boot personality change is desired. Such a determination may be made by a first operating system in response to an entity initiating the execution of one or more instructions intended to cause the boot personality change. For example, a network device administrator may locally or remotely cause execution of a script that includes instructions that cause the change of the boot personality. In one or more embodiments, if there is no boot personality change desired, the method returns to Step 202, and the execution of the first operating system continues. In one or more embodiments, if a boot personality is desired, the method proceeds to Step 206.

In Step 206, a determination is made whether to update the firmware of a secondary processor. In one or more embodiments, the entity initiating the change of boot personality may desire to also update the firmware of the secondary processor before actually causing the boot personality change and rebooting the network device so that the secondary processor will execute using the updated firmware after the reboot. In one or more embodiments, if an update to the firmware of a secondary processor is not desired, the method proceeds to Step 210. In one or more embodiments, if an update of the firmware of a secondary processor is desired, the method proceeds to Step 208.

In Step 208, the firmware of the secondary processor is updated. In one or more embodiments, updating the firmware includes writing the data that is the new firmware to persistent storage of a network device that is accessible by the secondary processor for use during operation of the secondary processor after a reboot of a network device. For example, a network device may include non-volatile flash memory for storage of firmware, and updating the firmware of the secondary processor includes writing the firmware data to the flash memory, which the secondary process will access and use after a reboot of the network device.

In Step 210, a health check is performed on the secondary processor to determine whether the secondary processor is fully operational and capable of performing functionality that will be performed after reboot when the network device is in a second boot personality (i.e., the secondary processor is 'healthy'). In one or more embodiments, performing a health check includes putting the secondary processor in an operational state (e.g., taking the secondary processor out of a 'reset' mode, providing power to the secondary processor, etc.). Performing a health check may further include sending data of any type to the secondary processor to determine if the secondary processor is healthy. The determination may be made based on whether a response is received from the secondary processor and/or the information included in the response. For example, one or more commands may be executed within the operating system executing on the primary processor that cause the primary processor to send data (e.g., a 'ping') to the secondary processor to cause the secondary processor to send a response. Such data and response may be communicated, for example, in the form of IPv6 packets over a USB link between the primary processor and the secondary processor, with the packets being sent from a given processor to the IPv6 address associated with the other processor.

In one or more embodiments, if a determination is made that the secondary processor is not healthy, the method proceeds to Step 212. In one or more embodiments, if a determination is made that the secondary processor is healthy, the method proceeds to Step 214.

In Step 212, the status of the secondary processor as not healthy is reported as an error. Such a report may take any suitable form for conveying the non-healthy status of the secondary processor. Examples of such reporting include, but are not limited to, writing the error to a log, displaying the error in any type of user interface operatively connected to the network device (e.g., in a command line interface, in a remote graphical user interface, etc.), a message being sent to a network administrator, etc. After Step 212, the method may end.

In Step 214, a command is executed to change the configuration of one or more hardware components of a network device to switch the network device from a first boot personality to a second boot personality. For example, a boot personality bit in persistent storage of a power management component of the network device may, via the execution of a command, be toggled from zero (which represents a first boot personality) to one (which represents a second boot personality).

In Step 216, a verification is performed that the network device is in a second boot personality. In one or more embodiments, the verification is performed by executing a command to read the one or more bits of one or more hardware components that define the boot personality of the network device, and then verifying that the bits are in a state that represents the second boot personality. For example, a boot personality bit in persistent storage of a power management component may be read to verify that it is set to one. In one or more embodiments, if the verification fails, Step 214 may be repeated to retry the boot personality switch. In one or more embodiments, there is a limit to the number of retries that may be performed before an error is reported (as discussed above in the description of Step 212). Once the verification that the network device is in the second boot personality is successful, the method proceeds to Step 218.

In Step 218, the network device is rebooted using any suitable method of reboot. Examples include, but are not limited to: automatically executing a reboot command upon successful verification in Step 216; prompting a user to enter a reboot command (remotely or locally) upon successful verification in Step 216; pressing a button on the network device to cause a power cycle and reboot; etc.

In Step 220, as part of the reboot performed in Step 218, a hardware component that controls the order in which network device processors are powered on provides power to the secondary processor before the primary processor of the network device. In one or more embodiments, operative connections to certain network device components are switched from the primary processor to the secondary processor.

In Step 222, a second operating system is obtained and stored in a network device data repository. In one or more embodiments, the second operating system is an operating system that requires the secondary processor to be powered on prior to powering on the primary processor so that the secondary processor will control and/or monitor a set of network device components and/or certain network device functionality. In one or more embodiments, to obtain the second operating system, the secondary processor obtains a boot loader, which may or may not be the same boot loader that was used while the network device was in the first boot personality. In one or more embodiments, the second operating system is obtained by the boot loader via accessing a storage location via a network where the second operating system is stored. In one or more embodiments, the second operating system is obtained from a storage location that is included in a network device (e.g., a network device data repository) or that is locally connected to the network device (e.g., an inserted USB flash drive).

In Step 224, the second operating system is obtained from storage and executed on the primary processor of the network device while the network device is in a second boot personality. In one or more embodiments, the second operating system, via the operative connection between the primary processor and the secondary processor, may obtain certain information relating to the network device components and/or network device functionality being controlled, managed, and/or monitored by the secondary processor. After Step 224, the method may end.

Although not shown in FIG. 2, in one or more embodiments, substantially the same method may be performed to return the network device to a first boot personality and executing a first operating system on the primary processor of the network device. In one or more embodiments, the return may be performed, at least in part, by performing Steps 200-204 while the network device is executing the second operating system in the second boot personality, then, instead of performing Steps 206-212, Step 214 is performed to configure one or more hardware components to put the network device in the first boot personality. In one or more embodiments, after verification (as in Step 216) and reboot (as in Step 218), the primary processor is powered on before the secondary processor, and the operative connections to a set of network device components are returned to the primary processor instead of the secondary processor, as existed while the network device was in the second boot personality. In one or more embodiments, a boot loader then obtains and stores the first operating system (as in Step 222), and the network device executes the first operating system on the primary processor while in the first boot personality, and the secondary processor is put into a state whereby it is not used by the first operating system.

Figure 3A:
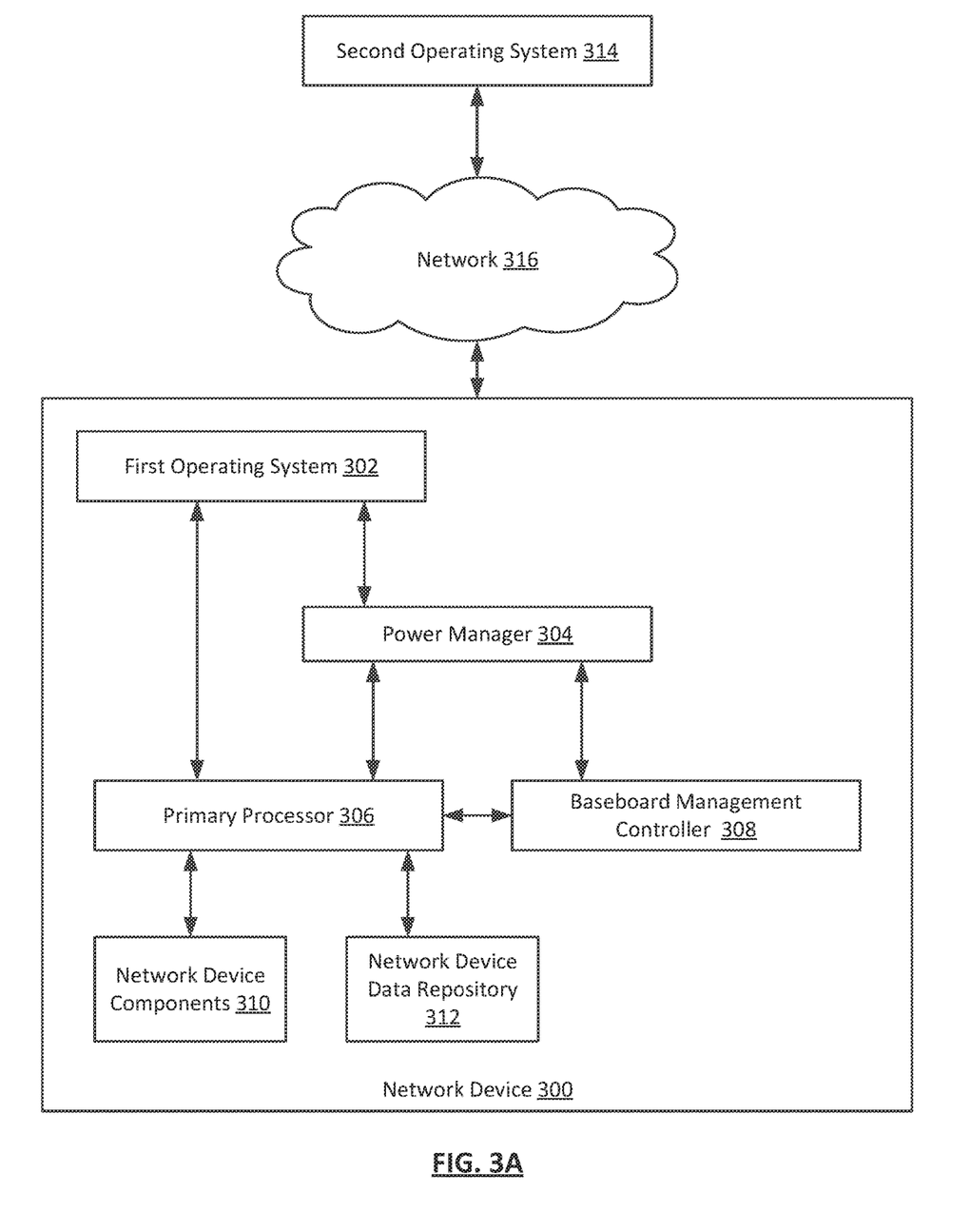
FIG. 3A and FIG. 3B show an example in accordance with one or more embodiments described herein.
Figure 3B:
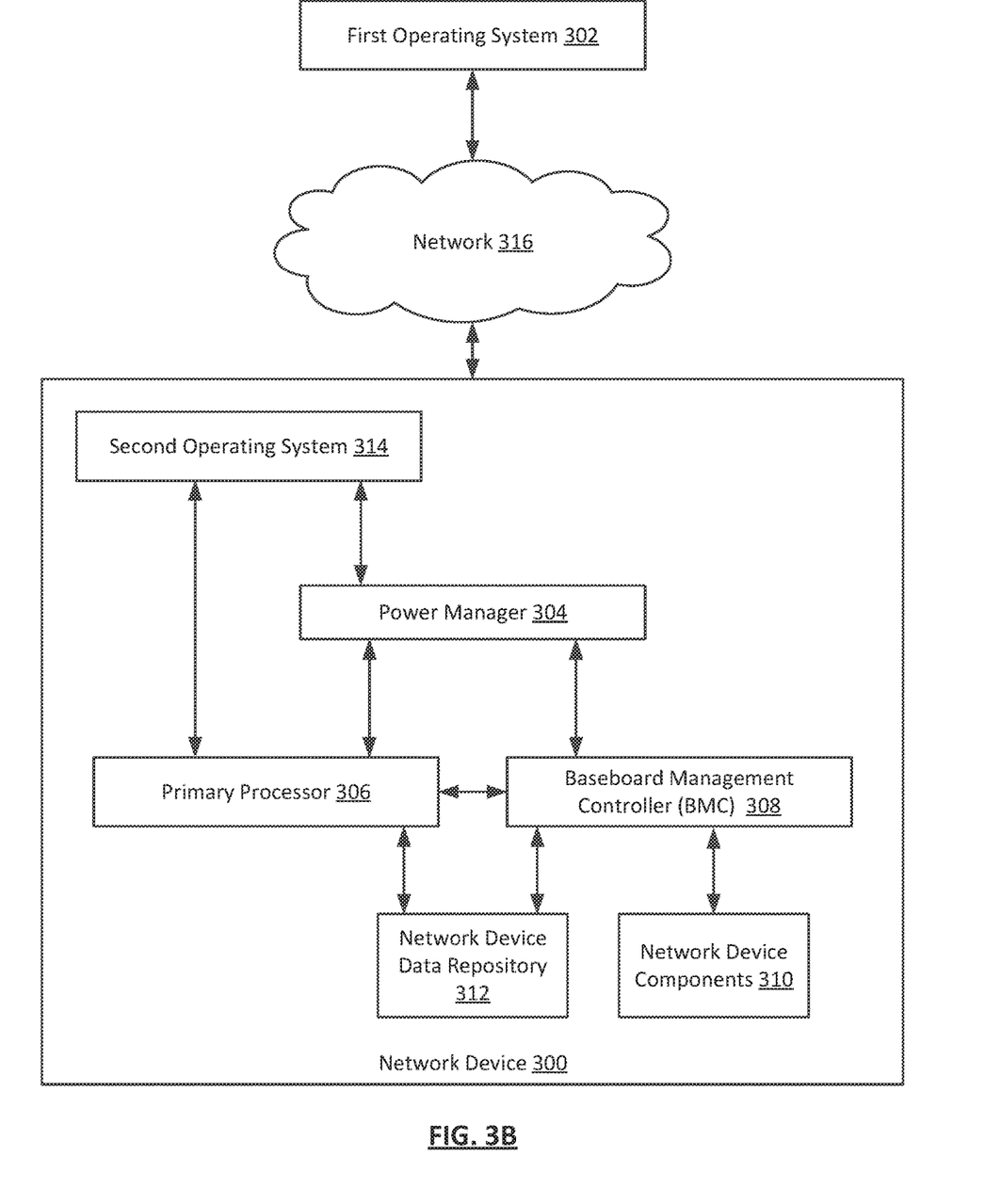

FIG. 3A and FIG. 3B show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3A and FIG. 3B, consider a scenario in which a network device (300) has been configured with and is operating in a first boot personality. As such, during boot of the network device (300), a primary processor (306) was powered on by a power manager (304) before powering on a BMC (308). The BMC (308) has been put in a reset state, as it will not be used during network device (300) operation.

A first operating system (302) is executing on the primary processor (306), and is operatively connected to a power manager (304). The power manager includes a boot personality control bit in persistent storage included in the power manager hardware.

The power manager (304) is operatively connected to at least the primary processor (306) and the BMC (308) so that it can power them on in an order based on the state of the boot personality control bit. If the boot personality control bit is set to zero, the network device is in the first boot personality. If the boot personality control bit is set to one, the network device (300) is in a second boot personality. Therefore, because the network device is currently in the first boot personality, the boot personality control bit is set to zero.

The primary processor (306) is operatively connected to a network device data repository (312), and to a set of network device components (310) that includes temperature sensors, humidity sensors, voltage sensors, fan speed sensors, persistent storage storing a boot loader, and a serial port that allows a user to access a console of the network device (300). The primary processor (306) also includes an operative connection to the BMC (308).

The network device (300) is operatively connected, via a network (316), to storage where a second operating system (314) is stored.

In such a scenario, an administrator of the network device (300) wants to execute the second operating system (314) instead of the first operating system (302). However, the network device (300) is currently in a first boot personality, and the second operating system requires that the network device (300) be in a second boot personality so that the BMC (308) is operational, was powered on before the primary processor (306), and is operatively connected to the set of network device components (310). Accordingly, the administrator (not shown) accesses a command line interface of the network device (300), and enters a command to execute a boot personality change script that includes a series of commands for changing the boot personality of the network device (300) from the first boot personality to the second boot personality.

The boot personality change script first puts the BMC (308) in an operational state, and then pings the BMC (308) via the operative connection between the primary processor (306) and the BMC (308). The ping successfully indicates that the BMC (308) is operational.

Next, the boot personality change script initiates and completes an update of the firmware of the BMC (308) to a new desired firmware. After the firmware updated, the BMC is reset again, and then re-pinged to verify that it is again operational with the new firmware.

Next, the boot personality change script executes a command to set the boot personality bit of the power manager (304) to one to change the boot personality of the network device (300) to the second boot personality. The boot personality change script then executes a command to read the boot personality bit and verifies that it was successfully set to one.

Next, the boot personality change script displays a prompt to the administrator requesting permission to execute a 'reboot network device' command. The administrator responds affirmatively, and, therefore, the 'reboot network device' is executed and the network device (300) reboots.

During the reboot, the power manager (304) checks the boot personality bit and determines that it is set to one. Therefore, the power manager (304) powers on the BMC (308) before powering on the primary processor (306) and the operative connections to the network device components (310) are switched from the primary processor (306) to the BMC (308).

Next, the BMC obtains and executes a boot loader (not shown). The boot loader obtains the second operating system (314) via the network (316), and stores the second operating system (314) in the portion of the network device data repository (312) where the first operating system is stored, thereby deleting the first operating system. Although this example contemplates deleting the first operating system by overwriting it, one having ordinary skill in the art, and the benefit of this Detailed Description, will appreciate that the second operating system may instead be written to a different storage location, and the boot loader can be configured to load the desired operating system.

The primary processor (306) then begins execution of the second operating system (314), and is in communication, via the operative link, with the BMC (308) regarding the network device components (310). Accordingly, the network device is now operating in the second boot personality. The results of the personality switch are shown in FIG. 3B.

One having ordinary skill in the art, and the benefit of this Detailed Description, will appreciate that the new location of the first operating system (302) in storage accessible by the network device (300) may or not be the same storage location where the second operating system (314) was previously stored, and that the first operating system (302) may merely be another copy of the first operating system (302).

Sometime later, the administrator decides to revert to the first operating system (302). However, the first operating system requires that the network device is in the first boot personality. Accordingly, the boot personality change script is executed again. Execution of the boot personality change script while the network device (300) is in the second boot personality causes the power manager (304) to have the boot personality bit toggled back to zero and the success of the toggle is verified, after which the network device (300) is rebooted again. During reboot, the power manager (304) determines that the boot personality bit is set to zero. Therefore, the primary processor (306) is powered on before the BMC (308), and the BMC is put in a reset state. The network device then obtains and executes a bootloader, which obtains a copy of the first operating system (302) via the network (316) and stores it in the network device data repository (312) in the location of the second operating system (314), thereby deleting the second operating system (314). The first operating system then begins execution on the primary processor (306) while the network device (300) is in the first boot personality.

Embodiments described herein allow for the operating system of a network device to be changed from one operating system to another with different requirements. Specifically, the new operating system may require a different order of powering on of processors of a network device, and operative connections of certain network device components to be changed from one processor to another processor to facilitate, at least in part, execution of the network device and the new operating system.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a boot personality, the method comprising:
    while executing a first operating system on a network device in a first boot personality using a first processor, executing a first command to modify a configuration of a hardware component of the network device to cause the network device to be configured in a second boot personality;
    performing a first reboot of the network device after executing the first command;
    initializing, based on the configuration of the hardware component and during the first reboot, a second processor before the first processor; and
    executing, after the initialization, a second operating system while the network device is in the second boot personality;
    while executing the second operating system in the second boot personality, executing a second command to modify the configuration of the hardware component of the network device to cause the network device to be configured in the first boot personality;
    performing a second reboot of the network device after executing the second command;
    initializing, based on the configuration of the hardware component and during the second reboot, the first processor; and
    executing, after the initialization, the first operating system on the first processor while the network device is in the first boot personality.

2. The method of claim 1, wherein, before executing the command, the first operating system performs a health check on the second processor.

3. The method of claim 1, further comprising:
    installing, before the first reboot a new firmware on the second processor.

4. The method of claim 3, further comprising:
    performing a health check on the second processor after installing the new firmware and before the first reboot.

5. The method of claim 1, further comprising:
    verifying, after executing the first command, that the network device is configured for the second boot personality before the first reboot.

6. The method of claim 1, further comprising:
    configuring, after initializing the second processor, a bootloader to obtain the second operating system and store the second operating system on the network device.

7. The method of claim 6, wherein the second operating system is obtained by the bootloader via a network.

8. The method of claim 6, wherein the second operating system is obtained by the bootloader from a storage location on the network device.

9. The method of claim 1, wherein initializing the second processor comprises:
    configuring a plurality of network device components to be operatively connected to the second processor instead of the first processor.

10. A non-transitory computer readable medium comprising instructions that, when executed by a processor, perform a method for managing a boot personality, the method comprising:
    while executing a first operating system on a network device in a first boot personality using a first processor, executing a first command to modify a configuration of a hardware component of the network device to cause the network device to be configured in a second boot personality;
    performing a first reboot of the network device after executing the first command;
    initializing, based on the configuration of the hardware component and during the first reboot, a second processor before the first processor; and
    executing, after the initialization, a second operating system while the network device is in the second boot personality;
    while executing the second operating system in the second boot personality, executing a second command to modify the configuration of the hardware component of the network device to cause the network device to be configured in the first boot personality;
    performing a second reboot of the network device after executing the second command;
    initializing, based on the configuration of the hardware component and during the second reboot, the first processor; and
    executing, after the initialization, the first operating system on the first processor while the network device is in the first boot personality.

11. The non-transitory computer readable medium of claim 10, wherein, before executing the command, the first operating system performs a health check on the second processor.

12. The non-transitory computer readable medium of claim 10, wherein the method performed by executing the instructions further comprises:
    installing, before the first reboot a new firmware on the second processor.

13. The non-transitory computer readable medium of claim 12, wherein the method performed by executing the instructions further comprises:
    performing a health check on the second processor after installing the new firmware and before the first reboot.

14. The non-transitory computer readable medium of claim 10, wherein the method performed by executing the instructions further comprises:

verifying, after executing the first command, that the network device is configured for the second boot personality before the first reboot.

15. The non-transitory computer readable medium of claim 10, wherein the method performed by executing the instructions further comprises:
configuring, after initializing the second processor, a bootloader to obtain the second operating system and store the second operating system on the network device.

16. The non-transitory computer readable medium of claim 15, wherein the second operating system is obtained by the bootloader via a network.

17. The non-transitory computer readable medium of claim 15, wherein the second operating system is obtained by the bootloader from a storage location on the network device.

18. The non-transitory computer readable medium of claim 10, wherein initializing the second processor comprises:
configuring a plurality of network device components to be operatively connected to the second processor instead of the first processor.

* * * * *